United States Patent
Chen

(10) Patent No.: US 8,464,622 B2
(45) Date of Patent: Jun. 18, 2013

(54) CIRCULAR SAW BLADE WITH CHANGEABLE BLADE STRIPS

(75) Inventor: John Chung-Kuang Chen, Vara (SE)

(73) Assignee: Newstar (Asia) Ltd, Hong Kong (CN)

( * ) Notice: Subject to any disclaimer, the term of this patent is extended or adjusted under 35 U.S.C. 154(b) by 249 days.

(21) Appl. No.: 13/052,602

(22) Filed: Mar. 21, 2011

(65) Prior Publication Data

US 2012/0132052 A1  May 31, 2012

(30) Foreign Application Priority Data

Nov. 26, 2010  (CN) .......................... 2010 1 0560616

(51) Int. Cl.
*B23D 61/06* (2006.01)

(52) U.S. Cl.
USPC .............................................. 83/838; 83/835

(58) Field of Classification Search
USPC ................ 83/838, 848, 835; 76/112; 144/237
See application file for complete search history.

(56) References Cited

U.S. PATENT DOCUMENTS

| 299,142 | A | * | 5/1884 | Hilton | 83/838 |
| 1,306,741 | A | * | 6/1919 | Blanchard | 76/112 |
| 1,526,861 | A | * | 2/1925 | Manderscheid | 451/542 |
| 2,670,766 | A | * | 3/1954 | Hiltebrand | 83/838 |
| 4,570,517 | A | * | 2/1986 | Souza et al. | 83/838 |
| 2010/0037745 | A1 | * | 2/2010 | Rattunde | 83/838 |

* cited by examiner

*Primary Examiner* — Ghassem Alie
(74) *Attorney, Agent, or Firm* — WPAT, PC; Justin King

(57) ABSTRACT

A circular saw blade has a frame, which includes a plurality of recesses and a groove. The circular saw blade also has at least two arc-shaped blade strips, each having a plurality of saw-teeth formed on the outer rim and at least one bump and a protruding piece on the inner rim, such that each bump is configured for mating with its corresponding recess on the frame and the protruding piece is formed extending along the circumference of the inner rim for insetting into the groove of the frame.

5 Claims, 6 Drawing Sheets

CIRCULAR SAW BLADE WITH CHANGEABLE BLADE STRIPS

FIELD OF THE INVENTION

The present invention relates to a circular saw blade with changeable blade strips, and more particularly, to a circular saw blade capable of prolonging its service life by replacing the blade strips mounted thereon. Thereby, the material consumption of a sawing operation using the circular saw blade can be reduced and consequently the cost of the whole sawing operation is lowered.

BACKGROUND OF THE INVENTION

Conventionally, a circular saw blade is a disc-like frame having a plurality of sawteeth equiangularly arranged on the circumference of the disc, whereas each sawtooth is fixed with a blade to be used in a sawing operation. Nevertheless, after a period of usage, it is most certain that there will be some damaged blades, and when the blades of a conventional circular saw blade are damaged, the circular saw blade can no longer function properly and have to be discarded.

In the aforesaid conventional circular saw blade that is generally composed of an integrally formed frame and a plurality of sawteeth welded on the frame, the major portion of the circular saw blade will be the frame itself while the sawteeth as a whole is only a comparatively small portion attached to the circumference of the frame. However, in a condition when there are damages to the sawteeth and a user keep using the damaged circular saw blade in a sawing operation without having it replaced for cost reason, no matter how small portion it is to the whole circular saw blade, poor cutting effect can be expected such as skewed sawing lines. Therefore, in order to have a satisfactory cutting, it is required to replace the whole circular saw blade that is determined unusable since it has only a few damaged sawteeth. Such action not only is wasteful in resource, but also might not be acceptable for use in view of cost.

SUMMARY OF THE INVENTION

The primary object of the present invention is to provide a circular saw blade with changeable blade strips, capable of prolonging its service life by replacing the blade strips mounted thereon, and thereby, the material consumption of a sawing operation using the circular saw blade can be reduced and consequently the cost of the whole sawing operation is lowered.

The second object of the invention is to provide a circular saw blade with changeable blade strips, capable of acting as those bidirectional circular saw blades by enabling the assembling of the circular saw blade to be reversible between a forward direction and a backward direction, and thus not only enabling the service life of the circular saw blade to be prolonged by twice as long, but also enabling the circular saw blade with changeable blade strips to be used in an electric saw device capable of driving the circular saw blade to rotate in a forward direction or a backward direction for using the different blades of the sawteeth to perform different sawing operations.

To achieve the above objects, the present invention provides a circular saw blade with changeable blade strips, adapted for an electric saw device, comprising: a disc-like frame, adapted for mounting on the electric saw device so as to be driven to rotate; at least two blade strips, designed to be assembled to the frame; and a plurality of bolts, for fixing the at least blade strips to the frame; wherein, after assembling the at least two blade strips to the frame, the rotating frame driven by the electric saw device is able to bring along the at least two blade strips to rotate therewith for performing a sawing operation in respective.

In an embodiment of the present invention, the frame, being a disc-like frame, further comprises: a plurality of recesses, distributed proximate to the edge thereof; and a groove, formed on the circumferential surface of the frame while extending along the periphery of the same. The at least two blade strips are capable of being assembled together into a ring-shaped structure, and each of at least two arc-shaped blade strips has a plurality of sawteeth formed on the outer rim thereof. In addition, each of the sawtooth is configured with blades. The inner rim of each blade strip is formed with at least one bump and a protruding piece in a manner that each bump is configured for mating with its corresponding recess on the frame and the protruding piece is formed discontinuously extending along the circumference of the inner rim for insetting into the groove of the frame, and thereby, after screw-fixing the at least two arc-shape blade strips to the circumference of the frame, a complete circular saw blade is achieved.

In an embodiment of the invention, each sawtooth of the at least two arc-shaped blade strips is configured with one forward blade and a backward blade, and consequently, each arc-shaped blade strips is capable of being fixed to the frame in a direction selected from the group consisting of: a forward direction and a backward direction, and thereby, the circular saw blade is able to operate while being driven to rotate in the forward direction, and also is able to operate while being driven to rotate in the backward direction.

In an embodiment of the invention, the circular saw blade with changeable blade strips can be adapted for those electric saw device having a pair of circular saw blades operating in opposite directions, and in a condition when each of the two circular saw blades used in an electric saw device is the circular saw blade with changeable blade strips of the present invention, the end of each of the plural bolts for fixing the blade strip to the frame of one corresponding circular saw blade is arranged extruding out of the frame by 0.25 mm while engaging with the frame of another circular saw blade used in the electric saw device, and thereby, the two circular saw blades can be separated form each other by a specific interval for preventing the two circular saw blades from contacting with each other, causing the circular saw blades to be softened or damaged by overheating.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
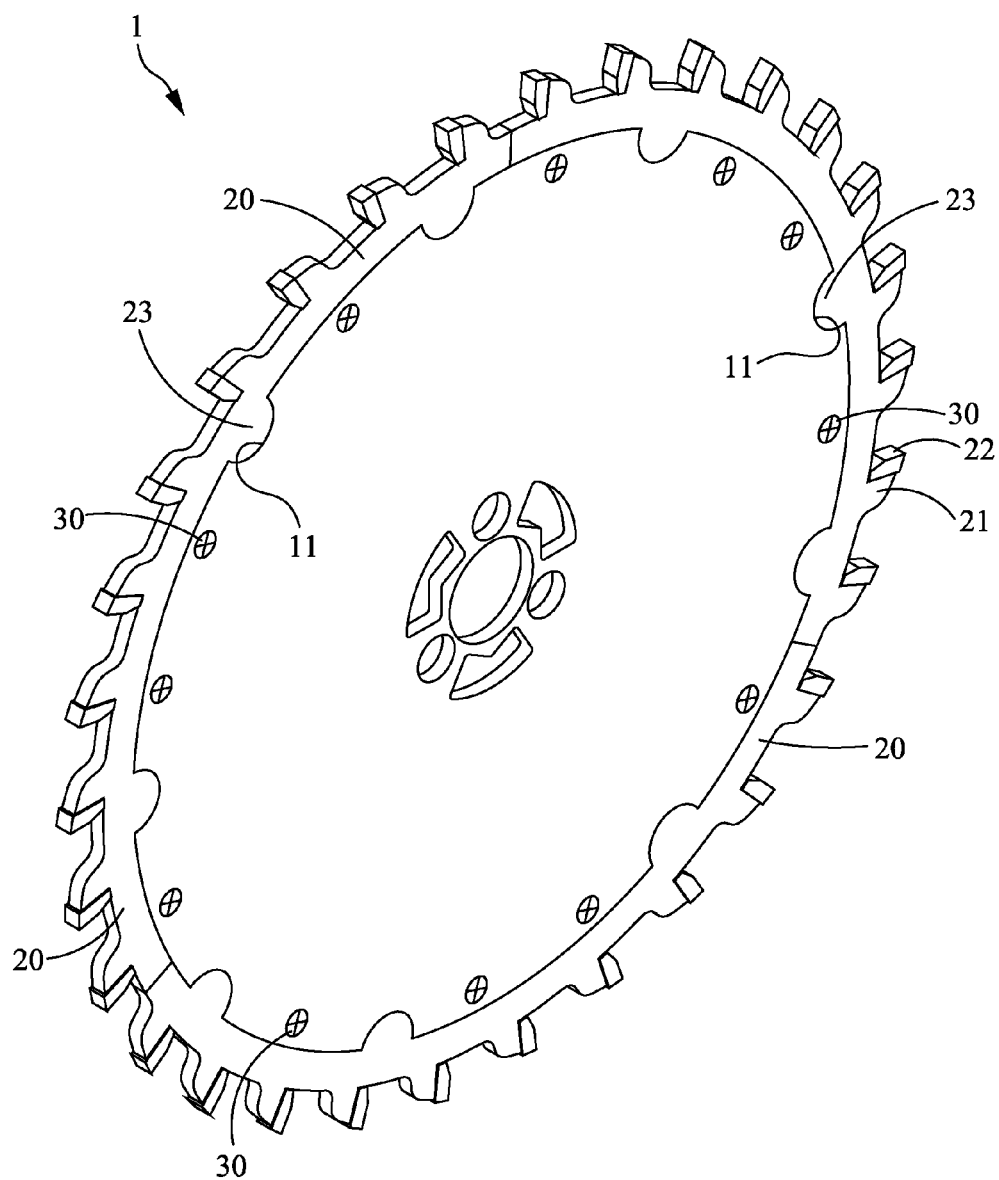
FIG. 1 is a three-dimensional view of a circular saw blade with changeable blade strips according to the present invention.
Figure 2:
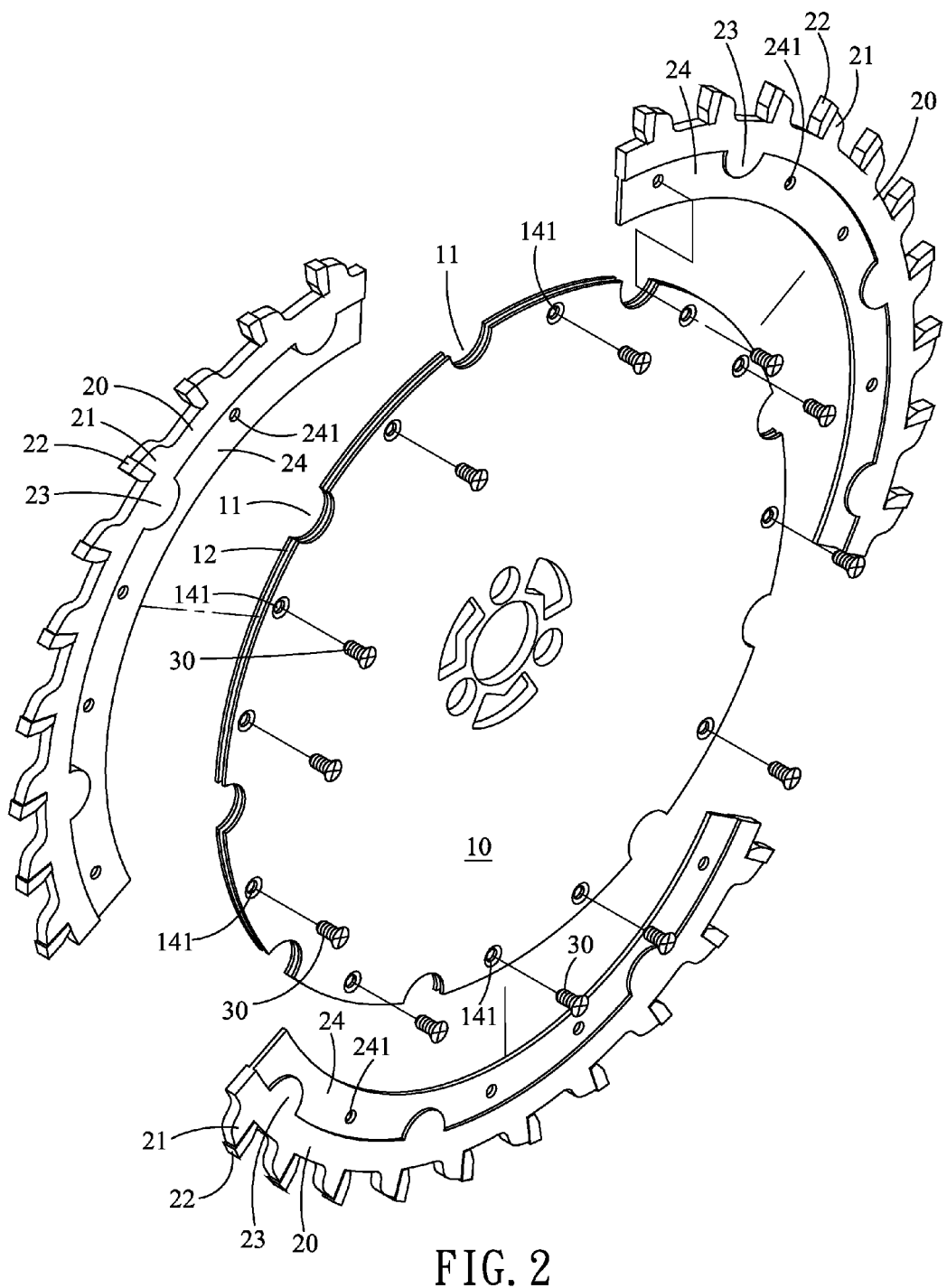
FIG. 2 is an exploded view of a circular saw blade with changeable blade strips according to an embodiment of the present invention.

Please refer to FIG. 1 and FIG. 2, which are a three-dimensional view and an exploded view of a circular saw blade with changeable blade strips according to an embodiment of the present invention. As shown in FIG. 1 and FIG. 2, the circular saw blade with changeable blade strips 1, which is substantially a circular saw blade adapted for an electric saw device, comprises: a frame 10, adapted for mounting on the electric saw device so as to be driven to rotate; at least two blade strips 20, designed to be assembled to the frame 10; and a plurality of bolts 30, for fixing the at least blade strips 20 to the frame 10.

Figure 3:
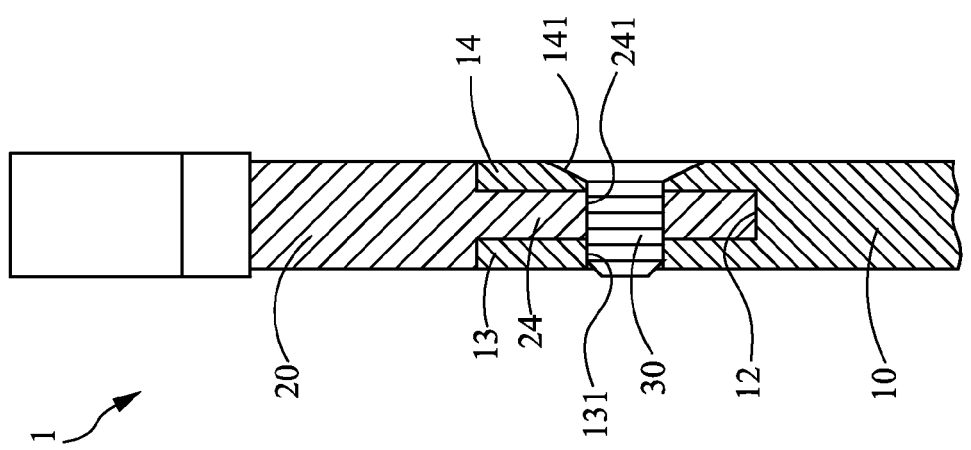
FIG. 3 is an enlarged view of the circular saw blade with changeable blade strips shown in FIG. 2.

In an embodiment of the present invention shown in FIG. 3, the frame 10, being a disc-like frame, further comprises: a plurality of recesses 11, distributed proximate to the edge thereof; and a groove 12, formed on the circumferential surface of the frame 10 while extending along the periphery of the same. It is noted that the groove 12 is substantially a circular concave 12 sandwiched between two sidewalls 13 and 14 that are disposed opposite to each other, whereas the sidewall 13 is provided for a plurality of screw holes 131 to be formed thereon, and sidewall 14 is provided for a plurality of screw holes 141 to be formed thereon at positions corresponding to the plural screw holes 131 on the sidewall 13.

The at least two blade strips 20 are designed to be assembled together into a ring-shaped structure, and each of at least two arc-shaped blade strips 20 has a plurality of sawteeth 21 formed on the outer rim thereof. In addition, each of the sawtooth 21 is configured with blades 22 for sawing a workpiece. The inner rim of each blade strip 20 is formed with at least one bump 23 and a protruding piece 24 in a manner that each bump 23 is configured for mating with its corresponding recess 11 on the frame 10 in a one-to-one manner, and the protruding piece 24 is formed extending along the circumference of the inner rim for insetting into the groove 12 of the frame 10. In addition, using a plurality of via holes 241 formed on the protruding piece 24 at positions corresponding to the screw holes 131 of the frame 10, the at least two arc-shape blade strips 20 are fixed to the circumference of the frame 10 by screwing the plural bolts 30 through the corresponding via holes 241 on the protruding piece 24 and then into their corresponding screw holes 131 on the frame 10.

Moreover, the diameters of the screw holes 141 formed on the sidewall 14 of the groove 12 that is provided for the blots 30 to insert therefrom are expanded for allowing the tapered heads of the blots 30 to be received therein.

Thereby, after screw-fixing the at least two arc-shape blade strips 20 to the circumference of the frame 10, the at least two blade strips 20 can be assembled together into a ring-shaped structure and thus a complete circular saw blade is achieved. That is, by insetting the protruding pieces 23 of the at least two blade strips 20 into the groove 11 of the frame 10 while enabling the at least two blade strips 20 to be fixed to the frame 10 by the use of the plural blots 30, the rotating frame 10 driven by the electric saw device is able to bring along the at least two blade strips 20 to rotate therewith for performing a sawing operation upon a workpiece.

Figure 4:
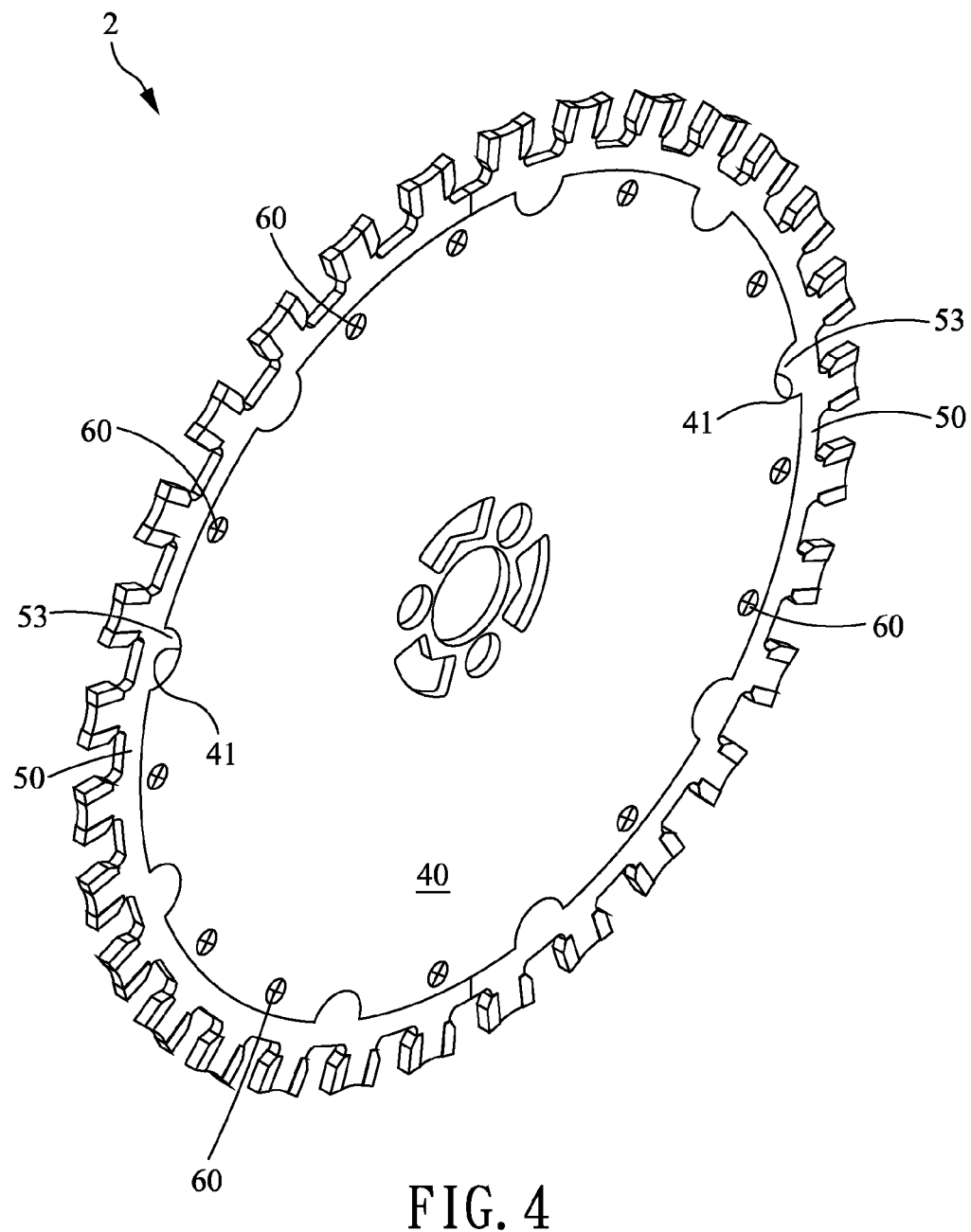
FIG. 4 is a three-dimensional view of a circular saw blade with changeable blade strips according to another embodiment of the present invention.
Figure 5:
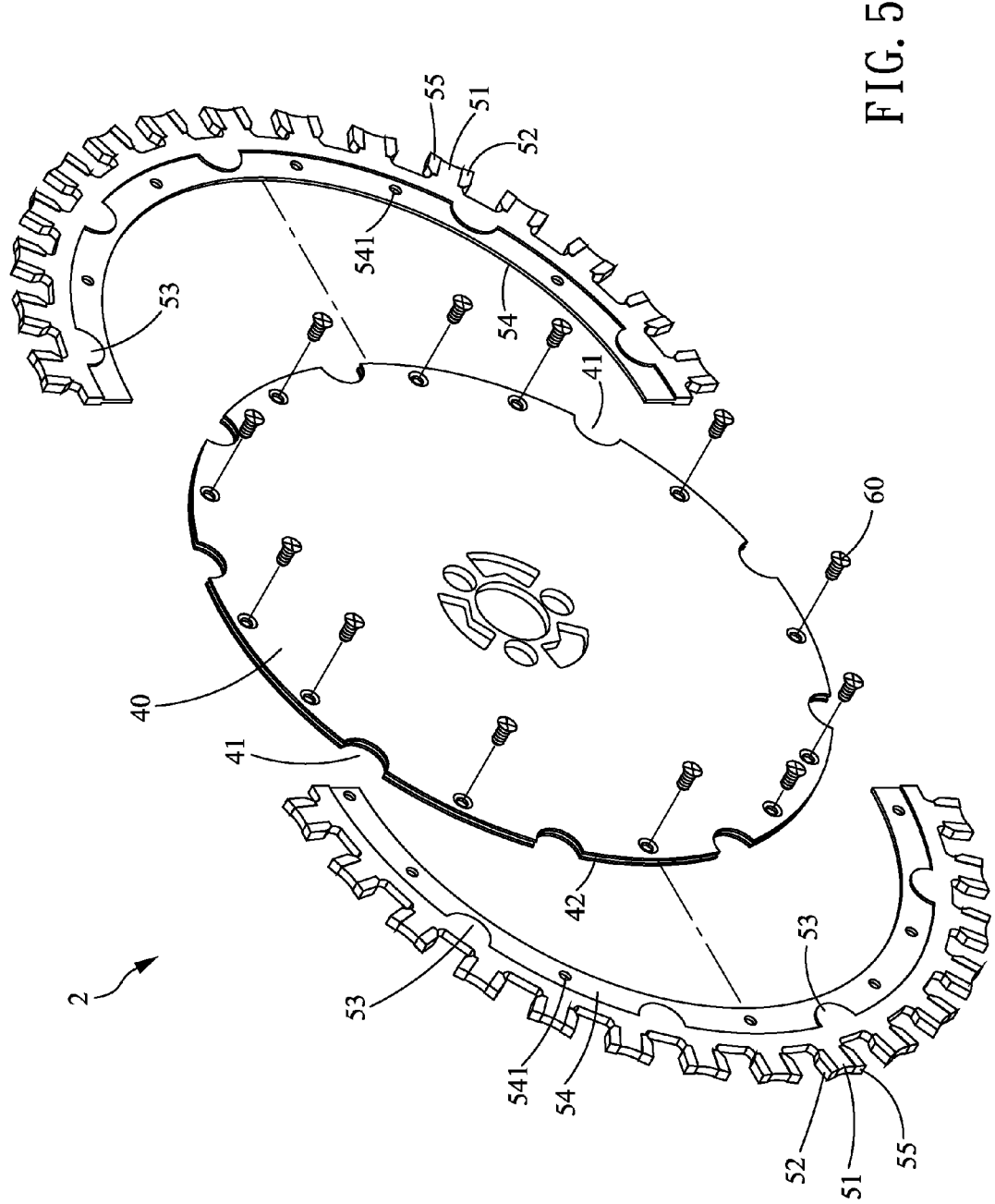
FIG. 5 is an enlarged view of the circular saw blade with changeable blade strips shown in FIG. 4.
Figure 6:
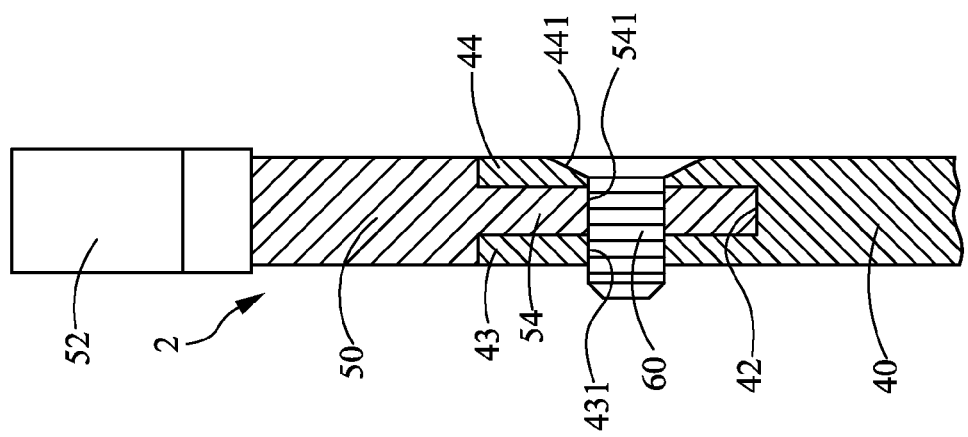
FIG. 6 is an enlarged cross section diagram showing a portion of the circular saw blade with changeable blade strips shown in FIG. 4.

It is noted that the circular saw blade with changeable blade strips can also be used as a bidirectional circular saw blade. Please refer to FIG. 4 and FIG. 5, which are a three-dimensional view of a circular saw blade with changeable blade strips according to another embodiment of the present invention, and an enlarged view of the circular saw blade with changeable blade strips shown in FIG. 4. As shown in FIG. 4 and FIG. 5, a bidirectional circular saw blade 2 comprises: a frame 40, adapted for mounting on the electric saw device so as to be driven to rotate; at least two blade strips 50, designed to be assembled to the frame 40; and a plurality of bolts 60, for fixing the at least blade strips 50 to the frame 40. Similarly, the frame 40 is also configured with recesses 41, a groove 42, two sidewalls 43, 44, a plurality of screw holes 431, 441, which are all the same as those shown in the embodiment of FIG. 2. Consequently, each of the at least two blade strips 50 is configured with bumps 53, a protruding piece 54 and via holes 541 that are the same as those formed on the at least two blade strips 20 of FIG. 2. Thus, the blots 60 are used for screw-fixing the at least two arc-shape blade strips 50 to the circumference of the frame 40 while allowing the at least two blade strips 20 to be assembled together into a ring-shaped structure, as shown in FIG. 6.

It is noted that each blade strip 50 is configured with a plurality of sawteeth 51, that are equiangularly disposed and extruding out of the outer rim of the corresponding blade strip 50, whereas each sawtooth 50 has two blades 52 and 55 disposed respectively at the front and rear of the same sawtooth 50. When the circular saw blade is being driven to rotate by the electric saw device in a forward direction, the front of each sawtooth 50, i.e. the blade 52 disposed at the front of each sawtooth 50, will engage with a workpiece for sawing the same, while allowing the rear of each sawtooth 50, i.e. the blade 55 disposed at the rear of each sawtooth 50, to be free from contacting with the workpiece. Consequently, after a period of usage, the blades 52 that are disposed at the front of the sawteeth 50 will suffer a certain degree of wear and tear while the blades 55 that are disposed at the rear of the sawteeth 50 will remain as new. Thus, one can simply detach the changeable blade strips 50 from the frame 40, and then reverse the detached changeable blade strips 50 by 180 degrees so as to be mounted on the frame 40 again, by that the blades 55 that was disposed at the rear of the sawteeth 50 will now being arranged in a manner that they will engage with the workpiece while rotating in the forward direction and thus allowing the damaged blades 52 to be free from contacting with the workpiece. Thereby, not only the service life of the circular saw blade can be prolonged by twice as long, but also the circular saw blade with changeable blade strips can be used in an electric saw device capable of driving the circular saw blade to rotate in a forward direction or a backward direction for using the different blades 52 and 55 of the sawteeth 50 to perform different sawing operations in respective.

Figure 7:
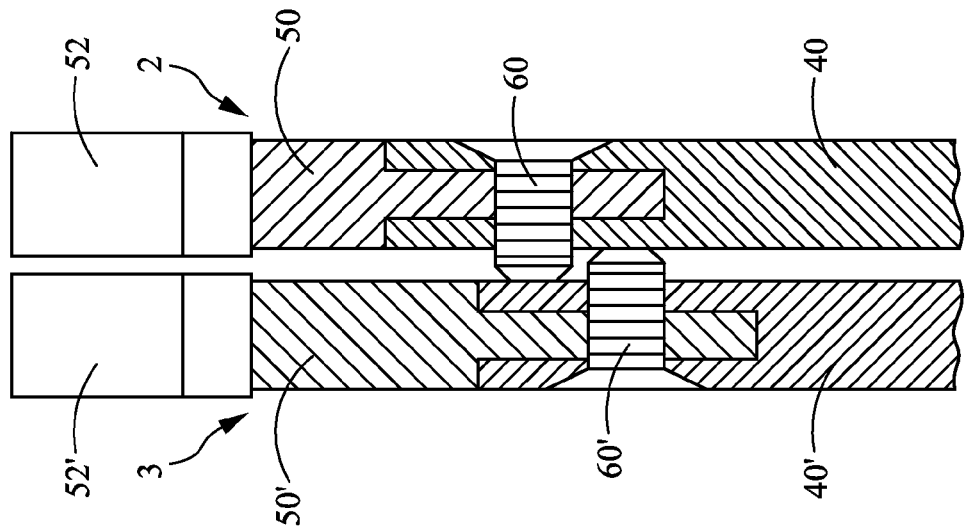
FIG. 7 is a schematic diagram showing how to apply the circular saw blade with changeable blade strips of the present invention in a saw device having a pair of saw blades rotating in opposite directions.

Please refer to FIG. 7, which is a schematic diagram showing how to apply the circular saw blade with changeable blade strips of the present invention in a saw device having a pair of saw blades rotating in opposite directions. In FIG. 7, the two circular saw blades 2 and 3 are structurally the same, but are different only in the screwing directions of their respective bolts 60 and 60'. It is noted that the two circular saw blades 2 and 3 on the electric saw device must be separated from each other by a proper interval so as to not only prevent the blades 52, 52', that are respectively formed on the blade strips 50, 50' of the two circular saw blades 2 and 3, from contacting to each other while rotating and thus being damaged by the heat resulting from the friction, but also enhance the cutting precision. A shown in FIG. 7, the end of each bolts 60, that is screwed to the frame 40 of the circular saw blade 2, is arranged extruding out of the frame 40 by 0.25 mm, while abutting against the frame 40' of another circular saw blade 3, and that is also true for the blots 60' screwed to the frame 40', and thereby, the two circular saw blades 2, 3 can be separated from each other by a proper interval. In this embodiment, the two circular saw blades 2, 3 are separated from each other by 0.03 mm. However, for preventing the bolts 60 of the circular saw blade 2 from contacting with the bolts 60' of the other circular saw blade 3, the distance between any bolt 60 and the rotation axis of its corresponding circular saw blade 2 is designed to be different from the distance between any bolt 60' and the rotation axis of its corresponding circular saw blade 3. That is, the blots 60 and 60' are arranged staggered relative to one another.

To sum up, the present invention provides a circular saw blade with changeable blade strips, by that the blade strip with damaged sawteeth can be replaced without having to replace the whole circular saw blade, and thus, the material consumption of a sawing operation using the circular saw blade can be reduced and consequently the cost of the whole sawing operation is lowered. Moreover, by applying the design of the changeable blade strips to bidirectional circular saw blade, the service life of the resulting bidirectional circular saw blade can be prolonged.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A circular saw blade with changeable blade strips, adapted for an electric saw device, comprising:
a circular frame with a circumference edge, for mounting on the electric saw device to be driven to rotate, the frame, further comprising:
a plurality of recesses, distributed along the circumference edge;
a groove, formed on and extended along the circumferential edge; and
a plurality of screw holes;
at least two arc-shaped blade strips, each having an outer rim and an inner rim, wherein a plurality of sawteeth is formed on the outer rim of each of said at least two arc-shaped blade strips, at least one bump and a protruding piece with a plurality of holes are formed on the inner rim of each of said at least two arc-shaped blade strips, and each bump is mating to one of the said plurality of recesses on the frame, and the protruding piece is insetting into the groove of the frame, and
a plurality of bolts;
wherein the at least two arc-shape blade strips are fixed to the frame by screwing the plurality of bolts through the holes and then into the screw holes on the frame.

2. The circular saw blade with changeable blade strips of claim 1, wherein the groove, being formed on the circumferential edge of the frame, is a circular concave sandwiched between a first side wall and a second side wall that are disposed opposite to each other and each is provided for the plurality of screw holes to be formed thereon while enabling the screw holes on said first side sidewall of said frame to align with the screw holes of said second sidewall of said frame.

3. The circular saw blade with changeable blade strips of claim 2, wherein each of said plurality of bolts has a tapered head, and said plurality of screw holes for receiving said plurality of bolts is sized to accommodate the tapered heads of the blots.

4. The circular saw blade with changeable blade strips of claim 1, wherein the plurality of sawteeth of each arc-shaped blade strip is equiangularly disposed and extruding out from the outer rim of each of said at least two arc-shaped blade strips, and each sawtooth has two blades disposed respectively at front and rear of each sawtooth.

5. The circular saw blade with changeable blade strips of claim 4, wherein each of the plurality of bolts is arranged extruding out of the frame by 0.25 mm.

* * * * *